United States Patent
Yoshino et al.

(10) Patent No.: US 10,309,451 B2
(45) Date of Patent: Jun. 4, 2019

(54) THRUST FOIL BEARING

(71) Applicant: NTN CORPORATION, Osaka (JP)

(72) Inventors: Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/770,929

(22) PCT Filed: Oct. 13, 2016

(86) PCT No.: PCT/JP2016/080354
§ 371 (c)(1),
(2) Date: Apr. 25, 2018

(87) PCT Pub. No.: WO2017/073343
PCT Pub. Date: May 4, 2017

(65) Prior Publication Data
US 2018/0306235 A1 Oct. 25, 2018

Related U.S. Application Data

(63) Continuation of application No. PCT/JP2016/080354, filed on Oct. 13, 2016.

(30) Foreign Application Priority Data

Oct. 28, 2015 (JP) .................................. 2015-211901

(51) Int. Cl.
F16C 32/06 (2006.01)
F16C 17/04 (2006.01)
F16C 27/02 (2006.01)

(52) U.S. Cl.
CPC ............ *F16C 17/042* (2013.01); *F16C 27/02* (2013.01); *F16C 17/04* (2013.01)

(58) Field of Classification Search
CPC ................................ F16C 17/042; F16C 27/02
See application file for complete search history.

(56) References Cited

U.S. PATENT DOCUMENTS 6,261,002 B1 * 7/2001 Ermilov ................ F16C 17/024
384/105
2015/0337894 A1 11/2015 Yoshino et al.
(Continued)

FOREIGN PATENT DOCUMENTS

JP 61-36725 3/1986
JP 61-38321 3/1986
(Continued)

OTHER PUBLICATIONS

International Preliminary Report on Patentability and Written Opinion of the International Searching Authority dated May 1, 2018 in International (PCT) Application No. PCT/JP2016/080354.
(Continued)

*Primary Examiner* — Phillip A Johnson
(74) *Attorney, Agent, or Firm* — Wenderoth, Lind & Ponack, L.L.P.

(57) ABSTRACT

A thrust foil bearing (20) includes a foil holder (21) and a plurality of foils (22). Each of the foils (22) includes: a top foil portion (22*a*); an extending portion (22*b*); and an underfoil portion (22*c*). The extending portion (22*b*) of the each of the foils (22) is arranged behind another of the foils (22) that is adjacent to the each of the foils (22) on the one circumferential side. The underfoil portion (22*c*) of the each of the foils (22) is arranged between the top foil portion (22*a*) of the another of the foils (22), which is adjacent to the each of the foils (22) on another circumferential side, and the end surface (21*a*) of the foil holder (21).

6 Claims, 5 Drawing Sheets

(56) References Cited

U.S. PATENT DOCUMENTS

2016/0265437 A1    9/2016  Yoshino et al.
2016/0356310 A1   12/2016  Yoshino et al.

FOREIGN PATENT DOCUMENTS

| JP | 63-195412 | | 8/1988 | |
|---|---|---|---|---|
| JP | 2006052837 A | * | 2/2006 | ............ F16C 17/042 |
| JP | 2014-119094 | | 6/2014 | |
| JP | 2014119094 A | * | 6/2014 | |
| JP | 2014122708 A | * | 7/2014 | .............. F16C 43/02 |
| JP | 2015-132333 | | 7/2015 | |
| SU | 846835 A1 | * | 7/1981 | ............ F16C 17/042 |

OTHER PUBLICATIONS

International Search Report dated Dec. 27, 2016 in International (PCT) Application No. PCT/JP2016/080354.

\* cited by examiner

THRUST FOIL BEARING

TECHNICAL FIELD

The present invention relates to a foil bearing, and more particularly, to a thrust foil bearing configured to support a shaft in thrust directions.

BACKGROUND ART

A foil bearing has bearing surfaces formed of flexible thin films (foils) having low flexural rigidity, and is configured to support a load by allowing the bearing surfaces to be deflected. During the rotation of the shaft, fluid films (such as air films) are formed between a shaft and the bearing surfaces of the foils, and the shaft is supported in a non-contact state.

For example, in Patent Literatures 1 to 3 listed below, there is described a thrust foil bearing configured to support a shaft in the thrust directions. The thrust foil bearing includes a plurality of foils (top foils) provided at a plurality of positions in a circumferential direction on an end surface of a disc-like foil holder. In each of the foils, an end portion on an upstream side in a rotation direction of the shaft is fixed to the end surface of the foil holder, whereas an end portion on a downstream side in the rotation direction of the shaft is set as a free end. When the shaft is rotated, a thrust bearing gap is formed between a bearing surface of each of the foils and an end surface of a thrust collar (thrust runner) provided on the shaft. With fluid films in the thrust bearing gaps, the shaft is supported in thrust directions in a non-contact state.

CITATION LIST

Patent Literature 1: Japanese Utility Model Application Laid-open No. Sho 61-36725
Patent Literature 2: Japanese Utility Model Application Laid-open No. Sho 61-38321
Patent Literature 3: Japanese Patent Application Laid-open No. Sho 63-195412

SUMMARY OF INVENTION

Technical Problem

In the above-mentioned thrust foil bearing described in Patent Literatures 1 to 3, a bump foil is arranged behind top foils, thereby imparting resiliency in an axial direction to the top foils. With this, the gap (thrust bearing gap) between the bearing surface of each of the top foils and the thrust collar is automatically adjusted so as to have an appropriate width in accordance with the pressure of the fluid film. However, when the bump foil is provided as described above, the number of components is increased, resulting in higher cost.

Further, in the above-mentioned thrust foil bearing, the end portion of each of the top foils on the downstream side in the rotation direction of the shaft is set as the free end. Thus, when the shaft is rotated in a reverse direction due to some cause, there is a fear in that the free ends of the foils are flipped over to be brought into contact with the shaft, resulting in damage to the foils.

In view of the above-mentioned circumstances, it is an object of the present invention to reduce cost of a thrust foil bearing and prevent damage to foils when a shaft is reversely rotated.

Solution to Problem

In order to solve the above-mentioned problems, according to one embodiment of the present invention, there is provided a thrust foil bearing, comprising: a foil holder; and a plurality of foils fixed to an end surface of the foil holder so as to be arrayed in a circumferential direction of the thrust foil bearing, the thrust foil bearing being configured to support the shaft, which is being relatively rotated in one circumferential direction, in thrust directions, each of the foils comprising: a top foil portion having a bearing surface; an extending portion formed on one circumferential side of the top foil portion; and an underfoil portion formed on another circumferential side of the top foil portion, the extending portion of the each of the foils being arranged behind another of the foils that is adjacent to the each of the foils on the one circumferential side, the underfoil portion of the each of the foils being arranged between the top foil portion of the another of the foils, which is adjacent to the each of the foils on another circumferential side, and the end surface of the foil holder.

As described above, when the underfoil portion of the another of the foils is arranged between the top foil portion of the each of the foils and the foil holder, the top foil portion overrides the underfoil portion to be curved. When the shaft is relatively rotated in one circumferential direction, a thrust bearing gap having a wedge-like shape is formed between the bearing surface of the top foil portion that is curved as described above and the end surface of the thrust collar provided on the shaft. At this time, a curved part of the top foil portion is elastically deformed, thereby adjusting the size the thrust bearing gap. As described above, when resiliency is imparted to the foils with the curved part of the top foil portion, it becomes unnecessary to arrange a bump foil. Thus, the number of components of the foil bearing is reduced, resulting in lower cost.

Further, in the above-mentioned foil bearing, the extending portion formed on the one circumferential side of the each of the foils is arranged behind another of the foils that is adjacent to the each of the foils on the one circumferential side. With this, even when the shaft is relatively rotated in a reverse direction (toward the another circumferential side), the end portion (extending portion) on the one circumferential side of the each of the foils is not flipped over, thereby being capable of preventing the damage to the foils.

In the above-mentioned foil bearing, for example, the extending portion of the each of the foils is inserted into each of recessed portions formed in the end surface of the foil holder, thereby being capable of fixing the plurality of foils to the foil holder.

In addition, in the above-mentioned foil bearing, the each of the foils has an insertion slot formed at a portion between the top foil portion and the underfoil portion of the each of the foils in the circumferential direction, and the extending portion of the each of the foils may be inserted into the insertion slot of the another of the foils that is adjacent to the each of the foils on the one circumferential side. In this case, the top foil portion and the underfoil portion of the each of the foils and the extending portions of the another of the foils, which are inserted into the insertion slots of each of the foils, are engaged with each other in the circumferential direction, thereby being capable of positioning the plurality of foils in the circumferential direction.

In addition, in the above-mentioned foil bearing, the each of the foils may comprise a fixing portion fixed to the foil holder. The fixing portion, for example, is formed so as to extend from the top foil portion toward a radially outer side or a radially inner side of the thrust foil bearing.

For example, when the fixing portion is formed in an entire region of the top foil portion in a circumferential direction, there is a fear in that deformation of the top foil portion (bearing surface) is inhibited, with the result that the thrust bearing gap having a wedge-like shape is less easily formed. Therefore, it is preferred that the fixing portion be formed only on a part of the each of the foils in a circumferential direction. Specifically, it is preferred that the fixing portion be formed, for example, in a region of the top foil portion in a circumferential direction, which is not supported by the underfoil portion of the another of the foils.

Advantageous Effects of Invention

As described above, according to the present invention, it is possible to reduce cost of a thrust foil bearing and prevent damage to foils when a shaft is reversely rotated.

DESCRIPTION OF EMBODIMENTS

Now, a thrust foil bearing according to an embodiment of the present invention is described with reference to the drawings.

Figure 1:
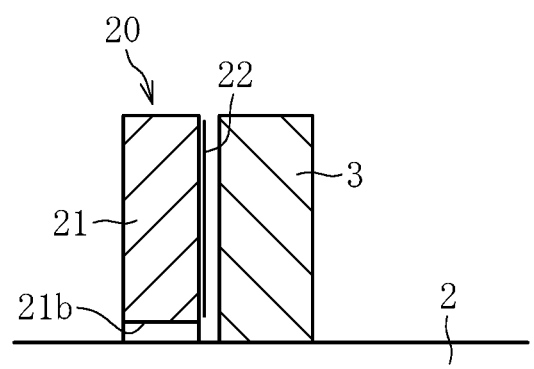
FIG. 1 is a sectional view of a thrust foil bearing according to an embodiment of the present invention.
Figure 1:
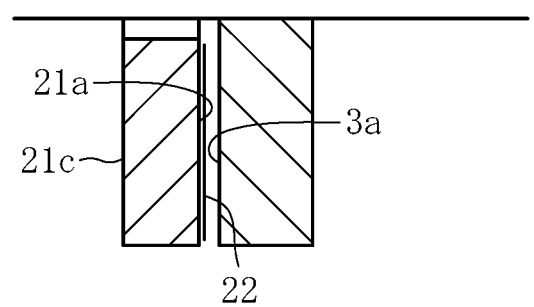
Figure 2A:
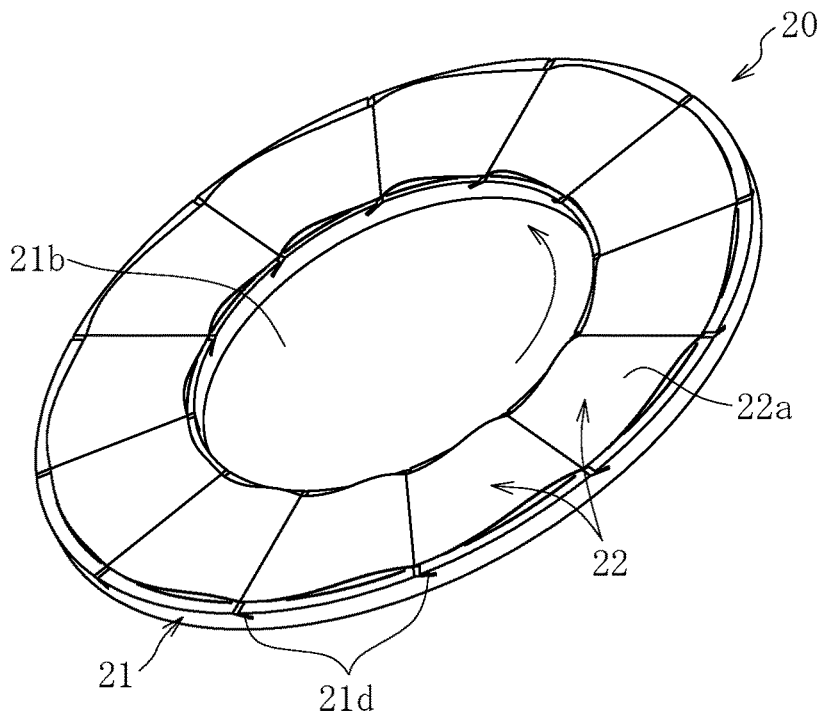
FIG. 2A is a perspective view of the above-mentioned thrust foil bearing.
Figure 2B:
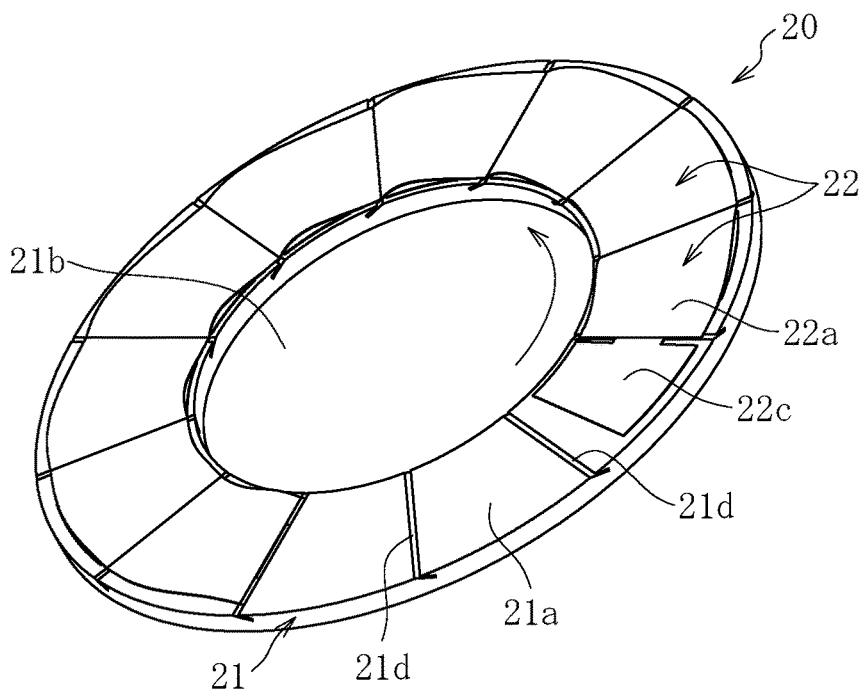
FIG. 2B is a perspective view for illustrating the thrust foil bearing of FIG. 2A under a state in which some foils are removed.

As illustrated in FIG. 1, a thrust foil bearing 20 is configured to support a shaft 2 in thrust directions with a fluid film formed between the thrust foil bearing 20 and a thrust collar 3 provided on the shaft 2. The thrust foil bearing 20 according to this embodiment is an air dynamic pressure bearing that uses air as a pressure generating fluid. As illustrated in FIG. 2A and FIG. 2B, the thrust foil bearing 20 comprises a disc-like foil holder 21, and a plurality of foils 22 fixed to an end surface 21a of the foil holder 21. A downstream side in a rotation direction of the shaft 2 (downstream side in the arrow direction in FIG. 2A and FIG. 2B) is hereinafter referred to as "one circumferential side", and an upstream side in the rotation direction of the shaft 2 (upstream side in the arrow direction in FIGS. 2A and 2B) is hereinafter referred to as "another circumferential side".

The foil holder 21 is made of metal or resin. As the metal for forming the foil holder 21, there are given, for example, sintered metal and ingot (for example, steel). The foil holder 21 has a hollow disc-like shape having an inner hole 21b into which the shaft 2 is inserted. The plurality of foils 22 are fixed to one end surface 21a of the foil holder 21, and another end surface 21c of the foil holder 21 is fixed to a housing (not shown). Radial grooves 21d being recessed portions for fixing end portions of the foils 22 are formed in the one end surface 21a of the foil holder 21 at a plurality of positions spaced apart from each other in the circumferential direction (see FIG. 2B). Both ends of each of the radial grooves 21d are opened to an inner peripheral surface and an outer peripheral surface of the foil holder 21, respectively. On one end or both ends of each of the radial grooves 21d, there may be provided a locking portion, which is to be engaged with each of the foils 22 so as to regulate movement of each of the foils 22 in a radial direction. The locking portions may be formed integrally with or separately from the foil holder 21.

Each of the foils 22 is made of a metal that is excellent in resiliency and processability, such as a steel material or a copper alloy. Each of the foils 22 is formed by subjecting a metal foil having a thickness of from approximately 20 μm to approximately 200 μm to press working or electrical discharge machining. As in this embodiment, in the air dynamic pressure bearing that uses air as a fluid film, a lubricating oil does not exist in an atmosphere. Thus, it is preferred that the metal foil be made of stainless steel or bronze.

Figure 3:
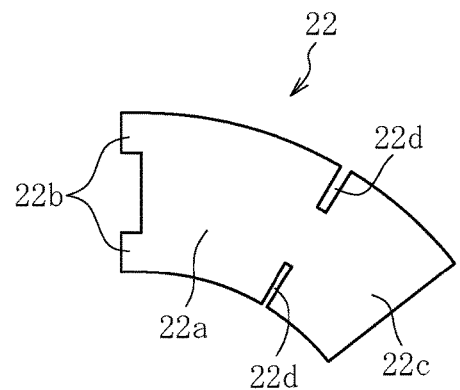
FIG. 3 is a plan view of the foil provided to the above-mentioned thrust foil bearing.

As illustrated in FIG. 3, each of the foils 22 comprises a top foil portion 22a, extending portions 22b formed on one circumferential side of the top foil portion 22a, and an underfoil portion 22c formed on another circumferential side of the top foil portion 22a.

The top foil portion 22a has a fan shape. One surface of the top foil portion 22a serves as a bearing surface opposed to an end surface 3a of the thrust collar 3 in an axial direction (see FIG. 4). In this embodiment, surfaces of the respective foils 22, which are directly opposed to the end surface 3a of the thrust collar 3, are all the top foil portions 22a. That is, the extending portions 22b and the underfoil portion 22c of each of the foils 22 are arranged behind the top foil portions 22a of another of the foils 22, and are not exposed on the thrust collar 3 side (see FIG. 2).

The extending portions 22b extend from the top foil portion 22a toward the one circumferential side. In the illustrated example, the extending portions 22b are provided on both radial ends (radially inner end and radially outer end) of each of the foils 22.

The underfoil portion 22c extends from the top foil portion 22a toward the another circumferential side. In the illustrated example, a radial width of the underfoil portion 22c is equal to a radial width of the top foil portion 22a. However, the radial width of the underfoil portion 22c and the radial width of the top foil portion 22a may be set to be slightly different from each other. For example, the radial width of the underfoil portion 22c may be set to be slightly smaller than the radial width of the top foil portion 22a.

Insertion slots 22d into which the extending portions 22b of the adjacent foil 22 are inserted are formed at a boundary between the top foil portion 22a and the underfoil portion 22c. The insertion slots 22d are provided at the same radial position as the extending portions 22b. In the illustrated example, the insertion slots 22d are formed at both ends of the foil 22 in the radial direction. A radial width of each of the insertion slots 22d is slightly larger than a radial width of each of the extending portions 22b to be inserted into the insertion slots 22d. The insertion slots 22d are opened to radial end portions of the foil 22, respectively.

Figure 4:
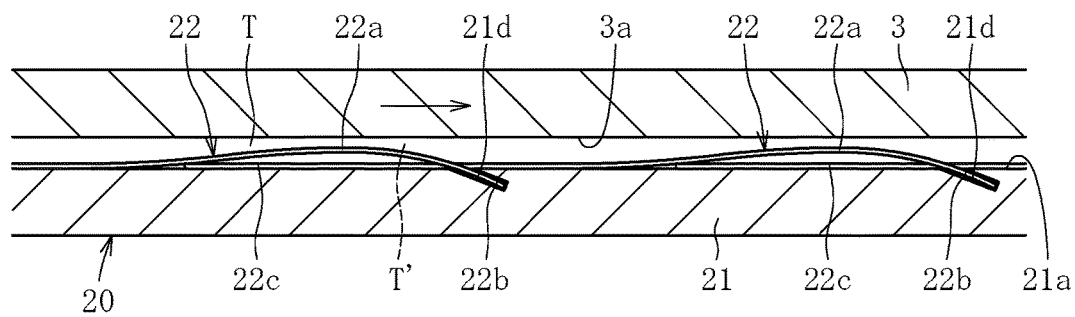
FIG. 4 is a circumferential sectional view of the above-mentioned thrust foil bearing.

The extending portions 22b of each of the foil 22 are inserted into the insertion slots 22d of the foil 22 adjacent thereto on the one circumferential side, and are arranged behind the top foil portion 22a of the adjacent foil 22 (see FIG. 4). Further, the extending portions 22b of each of the foils 22 are inserted into the radial groove 21d of the one end surface 21a of the foil holder 21. Meanwhile, the underfoil portion 22c of each of the foils 22 is arranged between the top foil portion 22a of the foil 22 adjacent thereto on the another circumferential side and the one end surface 21a of the foil holder 21. With this, a region of the top foil portion 22a, which is located on the one circumferential side, is supported by the underfoil portion 22c of the another foil 22 from behind, and a region of the top foil portion 22a, which is located on the another circumferential side, is not supported by the underfoil portion 22c of the another foil 22, and is held in contact with the one end surface 21a of the foil holder 21.

When the shaft 2 and the thrust collar 3 are rotated in one circumferential direction (in the arrow direction in FIG. 4), a thrust bearing gap T is formed between the bearing surface of the top foil portion 22a of each of the foils 22 of the thrust foil bearing 20 and the end surface 3a of the thrust collar 3. At this time, the region of the top foil portion 22a, which is located on the one circumferential side, overrides the underfoil portion 22c of the adjacent foil to be curved so that the thrust bearing gap T has a wedge-like shape narrowed toward the one circumferential side (on the downstream side in the rotation direction of the shaft). When air is pushed into the narrowed side of such thrust bearing gap T having a wedge-like shape, a pressure of an air film of the thrust bearing gap T is increased, and the increased pressure causes the shaft 2 and the thrust collar 3 to be supported in a non-contact state in the thrust directions.

At this time, due to resiliency (flexibility) of a curved part of the top foil portion 22a of each of the foils 22, the bearing surface of each of the foils 22 is suitably deformed in accordance with operating conditions such as a load, a rotation speed of the shaft 2, and an ambient temperature. Thus, the thrust bearing gap T is automatically adjusted so as to have an appropriate width in accordance with the operating conditions. As a result, even under severe conditions involving high temperature and high speed rotation, the thrust bearing gap T may be managed so as to have an optimum width, and hence the shaft 2 may be stably supported. As described above, in the above-mentioned thrust foil bearing 20, the top foil portion 22a of each of the foils 22 is caused to override the underfoil portion 22c of the another foil 22 to be curved so that resiliency can be imparted to the top foil portion 22a. Thus, an additional component for imparting the resiliency to the foils 22 (a bump foil or the like) becomes unnecessary, thereby being capable of reducing the number of components.

In particular, in the illustrated example, the extending portions 22b of each of the foils 22 are inserted into each of the radial grooves 21d of the foil holder 21 so that the vicinity of one circumferential end of the top foil portion 22a is inclined with respect to the end surface 21a of the foil holder 21. With this, a region of the top foil portion 22a, which includes the end portion on the one circumferential side portion, is easily curved to be raised toward the thrust collar 3 side (upper side in FIG. 4). Thus, the thrust bearing gap having a wedge-like shape is easily formed, and the resiliency of the top foil portion 22a can be enhanced.

When the shaft 2 is rotated in the one circumferential direction, due to friction with a fluid (air) flowing along with rotation of the shaft 2, the foils 22 are pushed toward the downstream side in the rotation direction to be brought into abutment against deep portions of the radial grooves 21d of the foil holder 21. With this, rotation of the foils 22 is stopped so that the foils 22 are positioned with respect to the foil holder 21 in the circumferential direction.

Further, in the above-mentioned thrust foil bearing 20, one circumferential end (extending portions 22b) of each of the foils 22 is arranged behind the top foil portion 22a of the another foil 22, and is not directly opposed to the end surface 3a of the thrust collar 3. With this, even when the shaft 2 is rotated in a direction opposite to the arrow in FIG. 4 due to some cause, the one circumferential end of each of the foils 22 is not flipped over, thereby preventing damage to the foils 22.

Further, in the above-mentioned thrust foil bearing 20, the top foil portion 22a of each of the foils 22 is curved to be raised at an intermediate portion in the circumferential direction. Therefore, when the shaft 2 is reversely rotated, on the one circumferential side with respect to the top portion of the top foil portion 22a, there are formed thrust bearing gaps T having a wedge-like shape', which each have a gap width gradually reduced toward a reverse rotation direction side (side opposite to the arrow in FIG. 4). The circumferential width of the thrust bearing gap T' is not so large. However, when air flowing along with reverse rotation of the shaft 2 is pushed toward the narrowed side of the thrust bearing gap T', a force of supporting the thrust collar 3 being reversely rotated in a floating manner can be obtained to some degree. Therefore, the above-mentioned thrust foil bearing 20 can allow reverse rotation of the shaft 2 to some degree.

Further, the foils 22 are not completely fixed to the foil holder 21, and are movable with respect to the foil holder 21. Therefore, during rotation of the shaft 2, due to an influence of the air films formed in the thrust bearing gaps T, the foils 22 are pushed against the foil holder 21. Along with this, slight sliding occurs between each of the foils 22 and the foil holder 21, in particular, between the surfaces of the top foil portion 22a and the underfoil portion 22c of each of the foils 22 and the one end surface 21a of the foil holder 21. Due to frictional energy generated by the slight sliding, vibration of the shaft 2 can be damped.

During the low speed rotation immediately before the stop or immediately after the actuation of the shaft 2, the bearing surface of each of the foils 22 and the end surface 3a of the thrust collar 3 come into sliding contact with each other. Thus, low-friction coating such as a DLC film, a titanium aluminum nitride film, a tungsten disulfide film, and a molybdenum disulfide film may be formed on one or both of the bearing surface of each of the foils 22 and the end surface 3a of the thrust collar 3. Further, in order to adjust a friction force generated by slight sliding between the foils 22 and the foil holder 21, the low-friction coating as described above may be formed on one or both of the foils 22 and the foil holder 21.

The present invention is not limited to the embodiment described above. Now, description is made of other embodiments of the present invention. Description overlapping with the embodiment described above is omitted.

Figure 5:
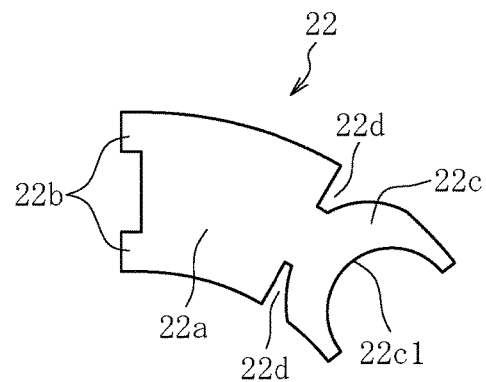
FIG. 5 is a plan view of a foil in another embodiment of the present invention.
Figure 6:
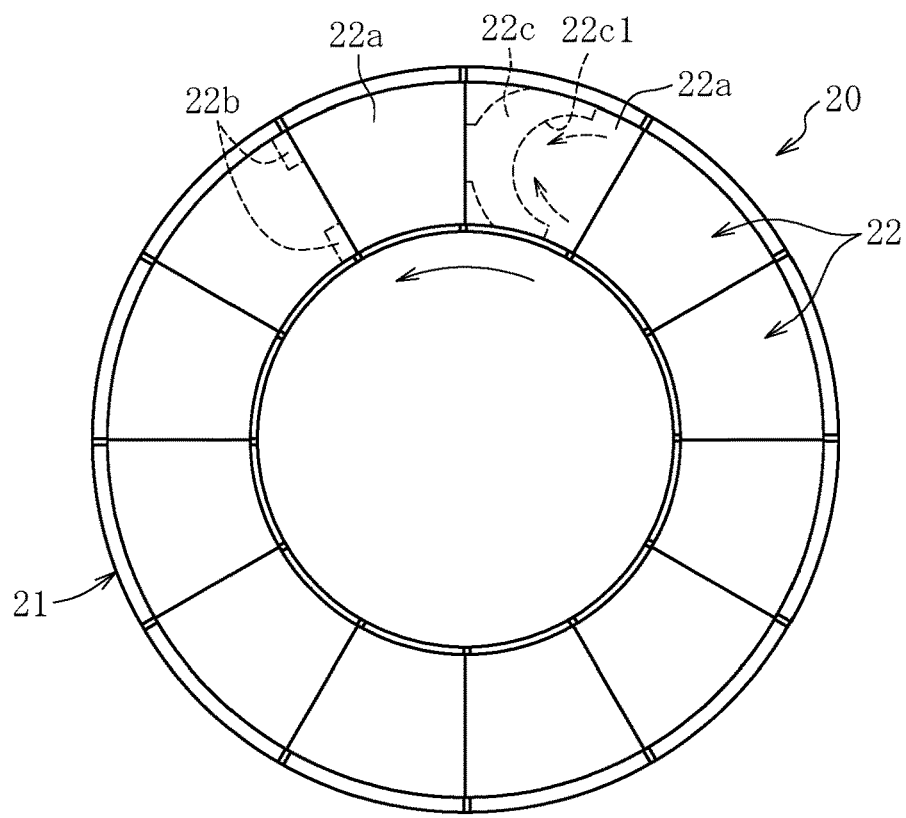
FIG. 6 is a plan view of a thrust foil bearing comprising the foils of FIG. 5.

A foil 22 illustrated in FIG. 5 comprises a cutout portion 22c1 at an edge of an underfoil portion 22c on another circumferential side. The cutout portion 22c1 has a radial width gradually reduced toward one circumferential side. In a thrust foil bearing 20 using such foils 22, as illustrated in FIG. 6, a top foil portion 22a of another foil 22 overrides the underfoil portion 22c of each of the foils 22 so that a step along the cutout portion 22c1 is formed on the top foil portion 22a. With this, a fluid flowing along the top foil portion 22a flows along the above-mentioned step to be collected to the radially center side of the top foil portion 22a (see dotted arrows), thereby enhancing the effect of increasing the pressure.

In FIG. 5 and FIG. 6, the cutout portion 22c1 is formed into an arc shape. However, the cutout portion 22c1 is not limited to this arc shape, and may be formed into an elliptical arc shape, a U-like shape, a V-like shape, or the like. Alternatively, the entire edge of the underfoil portion 22c on the another circumferential side may be formed into a spiral shape inclined to the radially inner side toward the one circumferential side.

Figure 7:
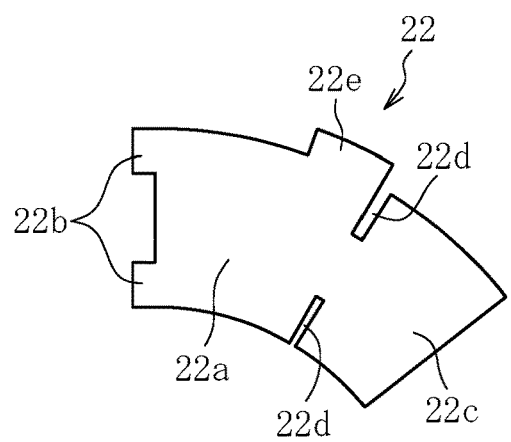
FIG. 7 is a plan view of a foil in another embodiment of the present invention.
Figure 8:
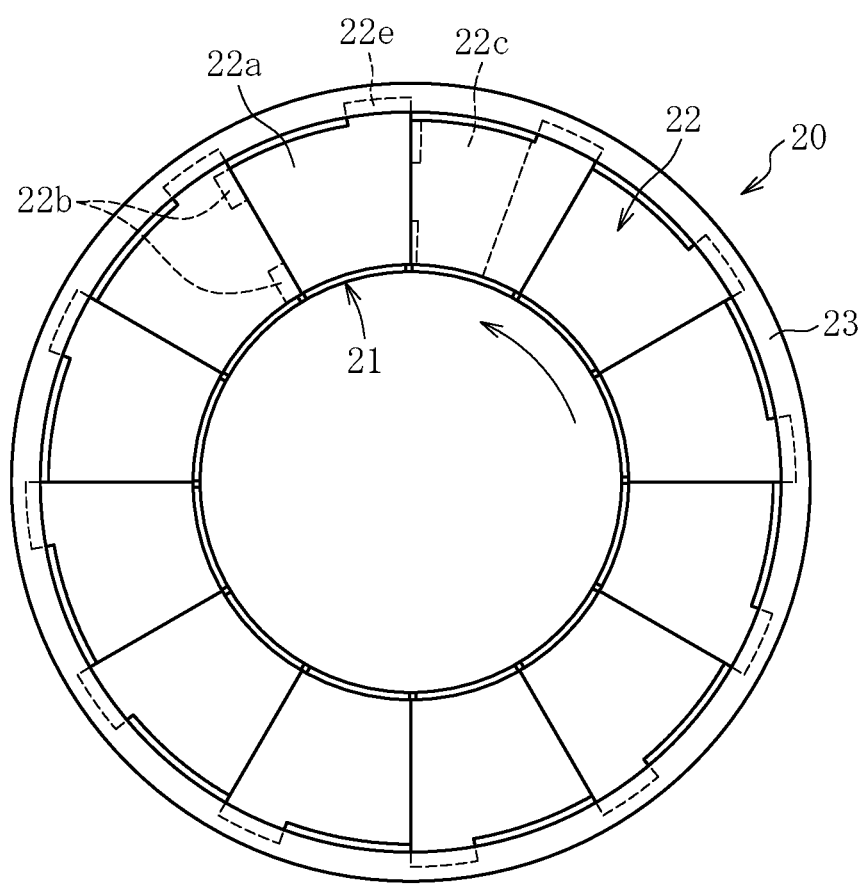
FIG. 8 is a plan view of a thrust foil bearing comprising the foils of FIG. 7.

In the embodiments described above, the case in which an entirety of each of the foils 22 is relatively movable with respect to the foil holder 21 is illustrated. However, the present invention is not limited thereto, and a part of each of the foils 22 may be fixed to the foil holder 21. For example, as illustrated in FIG. 7, a fixing portion 22e protruding from the top foil portion 22a of the foil 22 to the radially outer side may be formed, and the fixing portion 22e may be fixed to the end surface 21a of the foil holder 21. For example, as illustrated in FIG. 8, the fixing portion 22e is sandwiched between an annular fixing member 23 and the foil holder 21 from both the axial sides, to thereby be fixed to the foil holder 21. The fixing member 23 is fixed to the foil holder 21 by a bolt or a suitable method such as welding. The fixation of the fixing portion 22e to the foil holder 21 is not limited to the method using the fixing member 23, and the fixing portion 22e may be directly fixed to the foil holder 21 through, for example, welding or bonding.

In the embodiment illustrated in FIG. 7 and FIG. 8, the fixing portion 22e is formed at the vicinity of the end portion of the top foil portion 22a on the another circumferential side, in particular, is formed in a region of the top foil portion 22a, which is not supported by the underfoil portion 22c of the another foil 22 from behind. In this case, the region of the top foil portion 22a in a circumferential direction, which is located on the one circumferential side (region supported by the underfoil portion 22c), is not liable to be inhibited from being deformed due to the fixing portion 22e. Thus, as illustrated in FIG. 4, the top foil portion 22a is easily curved, thereby being capable of reliably forming the thrust bearing gap T having a wedge-like shape.

The fixing portion 22e may be formed on the radially inner side of the top foil portion 22a. The top foil portion 22a has a larger circumferential length at the radially outer side than at the radially inner side, and thus a region for forming the fixing portion 22e can be sufficiently secured at the radially outer side. Further, the fixing portion 22e may be formed on each of the radially outer side and the radially inner side of the top foil portion 22a. Note that, in this case, the foils 22 are hardly movable with respect to the foil holder 21, thereby reducing an effect of damping vibration, which may be obtained by sliding between the foils 22 and the foil holder 21. Therefore, in order to sufficiently obtain the effect of damping vibration, it is preferred that the fixing portion 22e be formed on only one of the radially outer side and the radially inner side of the top foil portion 22a.

The foil bearing according to the present invention is applicable to, and is preferably used as, for example, a bearing configured to support a turbine shaft of a gas turbine or a bearing configured to support a rotor of a turbo charger (supercharger). Further, the foil bearing according to the present invention may be used not only for turbo machines such as the gas turbine and the turbo charger, but widely used also as bearings for vehicles in which use of oil is restricted and bearings for industrial devices.

The foil bearings described above are each an air dynamic pressure bearing that uses air as a pressure generating fluid. However, the present invention is not limited thereto, and other gases or liquids such as water and oil may be used as the pressure generating fluid.

Further, the case in which the thrust foil bearing 20 serves as the stationary side, and the shaft 2 serves as the rotary side is described above. However, the present invention is not limited thereto, and may be applicable to a case in which the thrust foil bearing 20 serves as the rotary side and the shaft 2 serves as the stationary side, or a case in which both of the thrust foil bearing 20 and the shaft 2 are rotatable.

REFERENCE SIGNS LIST 2 shaft
3 thrust collar
20 thrust foil bearing
21 foil holder
21d radial groove (recessed portion)
22 foil
22a top foil portion
22b extending portion
22c underfoil portion
22d insertion slot
22e fixing portion
23 fixing member
T thrust bearing gap

The invention claimed is:

1. A thrust foil bearing, comprising:
a foil holder; and
a plurality of foils fixed to an end surface of the foil holder so as to be arrayed in a circumferential direction of the thrust foil bearing, wherein
the thrust foil bearing is configured to support a shaft, which is to be relatively rotated in one circumferential direction, in thrust directions,
each of the foils comprises:
  a top foil portion having a bearing surface;
  an extending portion formed on one circumferential side of the top foil portion; and
  an underfoil portion formed on another circumferential side of the top foil portion,
the extending portion of each of the foils is arranged at a side of an adjacent one of the foils on the one circumferential side that faces the end surface of the foil holder,
the underfoil portion of each of the foils is arranged between the top foil portion of another adjacent one of the foils on the another circumferential side and the end surface of the foil holder.

2. The thrust foil bearing according to claim 1, wherein the end surface of the foil holder includes a plurality of recessed portions and the extending portion of each of the foils is inserted into one of the recessed portions.

3. The thrust foil bearing according to claim 1,
wherein each of the foils has an insertion slot formed at a portion between the top foil portion and the underfoil portion in the circumferential direction, and
wherein the extending portion of each of the foils is inserted into the insertion slot of the adjacent one of the foils on the one circumferential side.

4. The thrust foil bearing according to claim 1, wherein each of the foils comprises a fixing portion fixed to the foil holder.

5. The thrust foil bearing according to claim 4, wherein the fixing portion of each of the foils extends from the top foil portion toward a radially outer side or a radially inner side of the thrust foil bearing.

6. The thrust foil bearing according to claim 4, wherein the fixing portion of each of the foils is formed in a region of the top foil portion in a circumferential direction, which is not supported by the underfoil portion of an adjacent one of the foils.

* * * * *